United States Patent [19]

Kao

[11] Patent Number: 5,958,621
[45] Date of Patent: *Sep. 28, 1999

[54] TWO-STEP PASTING OF THIN ELECTRODES

[75] Inventor: Wen-Hong Kao, Brown Deer, Wis.

[73] Assignee: Johnson Controls Technology Company, Plymouth, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,111

[22] Filed: Jan. 30, 1997

Related U.S. Application Data

[63] Continuation of application No. 08/446,548, May 19, 1995, abandoned.

[51] Int. Cl.$^6$ ........................................... H01M 4/62
[52] U.S. Cl. .................. 429/217; 429/94; 29/623.5; 427/126.1; 427/388.4; 427/427
[58] Field of Search ................. 429/94, 217; 427/126.1, 427/388.4, 421, 427; 29/623.5

[56] References Cited

U.S. PATENT DOCUMENTS

| | | | |
|---|---|---|---|
| 3,186,871 | 6/1965 | Donohue | 29/623.5 |
| 4,110,519 | 8/1978 | Nilsson | 29/623.5 |
| 4,383,011 | 5/1983 | McClelland et al. | 429/94 X |
| 4,407,911 | 10/1983 | Hooke | 429/94 |
| 4,551,401 | 11/1985 | Wilson | 29/623.5 X |
| 5,045,086 | 9/1991 | Juergens | 29/623.1 |
| 5,047,300 | 9/1991 | Juergens | 429/94 |
| 5,198,313 | 3/1993 | Juergens | 429/94 |
| 5,252,105 | 10/1993 | Witherspoon et al. | 29/623.5 X |
| 5,302,476 | 4/1994 | Kao et al. | 429/228 |
| 5,368,961 | 11/1994 | Juergens | 429/233 |

*Primary Examiner*—Stephen Kalafut
*Attorney, Agent, or Firm*—Quarles & Brady LLP

[57] ABSTRACT

A pasting operation for thin foils used in rechargeable electrochemical cells includes spraying a water based litharge on a lead foil substrate before the foil is wound to form a cylindrical electrode. To overcome problems with plate density, porosity and incomplete formation, the process would include the additional step of spraying an aqueous solution of an oxidant such as potassium persulfate on top of the litharge. The lag between spraying, the temperature and the concentrations are adjusted to cause the solution to mix into the damp paste and the litharge would be converted to conductive oxides. Improvements in plate density and increased porosity are noted and the process helps complete formation. Performance of the plates is also improved.

22 Claims, No Drawings

TWO-STEP PASTING OF THIN ELECTRODES

CROSS-REFERENCES TO RELATED APPLICATION

This is a continuation of U.S. patent application Ser. No. 08/446,548, filed May 19, 1995 now abandoned.

BACKGROUND OF THE INVENTION

1. Field of the Invention

The present invention relates generally to the field of electrochemical cells, and more particularly to an improved method for pasting electrode substrates. Still more specifically, the present invention, in its most preferred embodiment, relates to a two step operation for pasting thin metal foils in which the first pasting step proceeds or follows the application of a modifier such as a binder or an oxidant. In the most preferred embodiment, the first and second steps are performed by spraying the substrate with litharge and subsequently with a solution of persulfate modifier.

2. Description of the Prior Art

It is known to prepare electrochemical cells having improved recharge and discharge characteristics by using thin, non-perforated lead films. Such cells and their method of manufacture are described in U.S. Pat. No. 5,368,961 issued Nov. 29, 1994 to Juergens for "Thin Plate Electrochemical Cell", U.S. Pat. No. 5,198,313 issued Mar. 30, 1993 to Juergens for "Battery End Connector", U.S. Pat. No. 5,047,300 issued Sep. 10, 1991 to Juergens for "Ultra-Thin Plate Electrochemical Cell", and in U.S. Pat. No. 5,045,086 issued Sep. 3, 1991 to Juergens for "Method For Manufacture Of Electrochemical Cell". In these patents, thin non-perforated positive and negative plates, along with thin layers of active material and thin separator layers are described. Initially, the cells are produced with an excess of electrolyte, but through processing a reduce volume of electrolyte is obtained with respect to the absorptive capacity of the separators and the electrode materials.

The cells are preferably produced using films of lead or nickel having a thickness of approximately 0.002 inches. The active material is also thin, e.g. approximately 0.001 to 0.003 inches. The inter-plate spacing is 0.005 or more inches. The active lead materials include PbO and $Pb_3O_4$ or leady oxide for the positive plates and PbO for the negative plates. Conventional separator material may be employed, including those made from glass microfibers. Following the preparation of a stack of foils, active materials and separators, the stack is wound into a cylindrical shape and an electrochemical cell resembling other prior cylindrical batteries is produced.

Such cells have achieved commercial success, but certain problems remain in the manufacturing process and in obtaining the full benefits of the cell design. It is known, for example, that when spray guns are used to apply the active material to the foil, sulfate can cause the spray nozzles to clog over time. The result of using lower sulfate contents is a higher plate density than desired and low porosity, both of which can result in incomplete formation and a high self-discharge rate. The aforementioned Juergens patents indicate that the active material may be applied by either high pressure brush or high pressure spray technologies. After application of the active material, the plates are typically subjected to flash drying by infrared heat sources.

In unrelated disclosures relating to more conventional, flat plate lead-acid batteries, such as automobile batteries, it is known that performance can be improved by adding persulfate salts to basic lead sulfate and adding sufficient water to form a paste. The paste may also include lead oxide compounds. The paste described, for example, in U.S. Pat. No. 5,302,476 issued Apr. 12, 1994 to Kao, et al. for "High Performance Positive Electrode For A Lead-Acid Battery" is useful in forming electrodes which include a current collector and an active material in contact therewith. The electrodes, when formed, are capable of yielding high power discharge, and they have high porosity, high surface area and good strength characteristics.

A solution to the pasting problems inherent in the Juergens techniques described in the aforementioned patents would represent a significant advance in that technology.

SUMMARY OF THE INVENTION

A feature of the present invention is an improved method for pasting electrochemical cell substrates. In its preferred form, the invention features a technique for pasting thin, non-perforated positive and negative battery plates, including, but not limited to those described in connection with the background section of this specification.

A further feature of the present invention is a technique for improving the density and porosity of the active material used with such plates, yielding more complete formation and reducing self-discharge rates.

A further feature of the present invention is to provide a two-step method for applying materials to an electrochemical plate, in one step adding the active material and in another step adding a modifier such as an oxidizer.

Yet another feature of the present invention is to improve spraying technology for applying active material to battery plates wherein a separate step is used to add one or more other materials to the paste to improve density, porosity, self-discharge and formation characteristics.

How these and other features of the present invention are accomplished will be described in the following Detailed Description of the Preferred Embodiment. Generally, however, they are accomplished by a two-step pasting method in which either the active material or a modifier is first applied to the substrate. In its most preferred embodiment the substrate is a thin, non-perforated plate. Following the initial pasting step, a modifying step includes applying a modifier, such as an aqueous solution of an oxidizer. In its preferred embodiment, both the pasting and the modifying steps are carried out using high pressure nozzles and, when an oxidizer is used, the oxidizing material is preferably a persulfate, most preferably potassium persulfate. The features of the invention can also be accomplished using other paste applying techniques, such as pasting brushes and the like. Other ways in which the features of the invention are accomplished will become apparent to those skilled in the art after they have read and understood the present specification. Such other ways are deemed to fall within the scope of the present invention.

DETAILED DESCRIPTION OF THE PREFERRED EMBODIMENT

Before proceeding to the preferred embodiment of the present invention, several general comments need to be made about the applicability and scope of the invention. First, the present specification will not describe in detail either the materials or the dimensional relationships used in the most preferred embodiment, since such information is readily available from the aforementioned Juergens patents, the full disclosures of which, including FIGURES, are incorporated herein by this reference. Furthermore, with regard to the use of modifiers, especially oxidants, such as persulfates in battery manufacture, reference is again made to the Kao, et al. patent, the entire specification of which is also incorporated by this reference.

Second, while the comments in this description will relate primarily to electrochemical cells prepared by using ultra-thin, non-perforated negative and positive films, the invention is broader in that the two-stage pasting operation could be employed for other types of batteries. Furthermore, while the description specifically mentions the use of high pressure nozzles for the application of the paste and the oxidant, other application techniques could be used for either or both steps without departing from the invention's intended scope. Generally, the invention has applicability to any pasting system where the resultant paste layer has insufficient density and porosity to prevent adequate formation, yielding undesirable self-discharge characteristics.

Proceeding first with a description of the modifiers useful in the present invention, the preferred compounds are those which are described in the aforementioned U.S. Pat. No. 5,302,476. Specifics for the materials may be found in the detailed description contained in that patent. Generally, however, a persulfate modifier for use in the present invention may be any suitable persulfate salt, such as sodium persulfate ($Na_2S_2O_8$), potassium persulfate ($K_2S_2O_8$), calcium persulfate ($CaS_2O_8$) or ammonium persulfate ($(NH_4)_2S_2O_8$). Other Group IA, IIA or metal persulfate salts may also be employed according to the present invention. Other modifiers include binders and other reactants. For example, if a nickel electrode is used the modifier can be a mixture of nickel nitrate and potassium hydroxide to precipitate nickel hydroxide.

Water is added in an amount sufficient to form a sprayable composition. Preferably, water is added in an amount of about 10% to about 30%, most preferably 15% to about 25%, based on the weight of the components. In any event, the amount of water should be sufficient for the modifier reaction (e.g. the persulfate reaction) to take place with the lead oxide materials contained within the lead component of the system.

Preferred plates to which the modifier material of the present invention may be added include those described in the aforementioned Juergens patents, and such plates may be prepared using the techniques described in the detailed description of the aforementioned U.S. Pat. No. 5,045,086. For example, the drag rollers mentioned therein may be used to smoothly facilitate movement of the separator toward the foils layered with active material, and electrolyte may be added to the overall systems as described therein. Negative plates and positive plates are advanced by mandrels, and winding devices are used for preparing coiled components with plate carriages acting as conveyor belts to facilitate advancement of the various materials toward the mandrels.

As in the aforementioned Juergens systems, the active paste material is preferably applied to both major faces of the positive and negative plates to form the preferred coiled electrode system. The application of the paste may be accomplished by the use of high pressure brushes or by high pressure spray nozzles as described therein. After the active material has been applied, the combination may be subjected to flash drying, such as by the use of infrared heat sources. Since some moisture is always contained within the paste, the infrared sources will dry it adequately in a very short period of time.

As mentioned previously, the preferred sequence is to add the paste material and follow that step with an application of the modifier, e.g. the persulfate. The latter material may also be applied using the brush or nozzle systems recited above and, in fact, the two materials may be added simultaneously, especially if nozzles are used. Furthermore, the two steps an be entirely reversed, where the modifier is applied first and the paste applied thereover. Relatively speaking, it is desired to apply the persulfate material in an amount, relative to the active material of between about 2% to about 25% by weight, most preferably 4% to 10%. The important factor is for the modifier solution to mix into the damp paste before drying takes place, a process step which can be controlled by the lag time of the second spray, the temperatures employed and/or the modifier concentration in the aqueous solution.

With regard to the active materials themselves, they are well-known in the battery art and most preferably consist of basic lead sulfate components with additive salts and oxides as is well-known. Detailed descriptions of suitable lead compounds for use in preparing battery plates are contained in the aforementioned Kao, et al. U.S. Pat. No. 5,302,476.

With regard to the most preferred embodiment of this invention, ultra-thin, non-perforated films of either lead or nickel are used in combination with extremely thin layers of the active material. Separator material is disposed therebetween to absorb the electrolyte that is contained within any enclosed cell system. It is important that the film not only be extremely thin, but that it be non-perforated. This is because it is desired that no active material be at a distance greater than 0.005 inches from the film on which it is coated. Most preferably, the films are no greater than 0.005 inches thick, and in the preferred embodiment the films are 0.003 to 0.0015 inches. Utilizing such thin film, it is possible to increase the ratio of surface area to the amount of active paste material. In the present invention, a ratio of greater than 260 $cm^2$ of surface area to a gram of active material is preferred.

In the most preferred embodiment, the layers of active material are also supplied in a very thin amount, each being at the most 0.005 inches and more preferably between 0.002 and 0.003 inches. This results in the positive and negative plates having a combined thickness of at most 0.01 inches, and in the preferred embodiment the thickness is 0.005 to 0.008 inches, with an interplate spacing of about 0.005 to 0.007 inches. Various physical arrangements for the plates and the way in which they may be wound into a compact cylindrical configuration are described in the aforementioned prior art Juergens patents. Similarly, such patents describe the intercell connectors and various techniques for etching the film, the active sheets and the like as described in the various patents mentioned above.

The materials used for the films are most preferably lead that is at least 99.99% pure. In alternate embodiments, the lead may contain up to 0.50% tin. Various combinations of acid materials may be used for these thin, non-perforated foils as is described in the detailed embodiment, for example Juergens U.S. Pat. No. 5,045,086. Note especially columns 7 and 8 thereof. For example, additives useful in battery plates, such as carbon fibers and the like may be employed. Also described in that section are the types of separator material which are suitable for use in the present invention, as well as the types of electrolyte, most preferably sulfuric acid having a concentration of between 1.20 and 1.32 specific gravity. Vent systems are also disclosed in the aforementioned prior art patent.

Before leaving this Detailed Description, it should be repeated that the present invention is applicable to thicker electrode systems useful for batteries, with the amount of modifier, such as persulfate, being adjusted as will be appreciated by one skilled in the art. The resultant plates have improved density, improved porosity, a lower self-discharge rate and improved formation characteristics when compared to plates which have been prepared without the oxidant step.

The present invention has been described in connection with the detailed description above, but the invention may be variously embodied. Accordingly, the invention is not to be limited by the foregoing discussion, but it is to be limited solely by the claims which follow and which find their support herein above.

What is claimed is:

1. In a method for preparing electrodes for electrochemical cells in which electrode plates are coated with a damp active paste material and are subsequently dried and wound into a substantially cylindrical configuration, the improvement comprising mixing a modifier into said paste to improve formation characteristics and reduce self-discharge tendencies.

2. The method of claim 1 wherein the modifier is applied in the form of an aqueous mixture.

3. The method of claim 2 wherein the modifier is applied at a rate of 2%–25% by weight, as compared to the weight of the active material.

4. The method of claim 1 wherein the modifier is applied to the pasted electrode before it is dried.

5. The method of claim 1 wherein the modifier is a binder.

6. The method of claim 1 wherein the modifier is applied by spraying.

7. The method of claim 1 wherein the modifier is applied by brushing.

8. In a method for preparing electrodes for electrochemical cells in which electrode plates are coated with a damp active paste material and are subsequently dried and wound into a substantially cylindrical configuration, the improvement comprising applying a modifier which mixes with said paste to the plates to improve formation characteristics and reduce self-discharge tendencies, wherein the modifier is a persulfate.

9. The method of claim 8 wherein the persulfate is potassium persulfate.

10. In a method for preparing electrodes for electrochemical cells in which electrode plates are coated with a damp active paste material and are subsequently dried and wound into a substantially cylindrical configuration, the improvement comprising applying a modifier which mixes with said paste to the plates to improve formation characteristics and reduce self-discharge tendencies, wherein the modifier is applied to the electrode plates before the paste material is applied thereto.

11. In a method for preparing electrodes for electrochemical cells in which electrode plates are coated with a damp active paste material and are subsequently dried and wound into a substantially cylindrical configuration, the improvement comprising applying a modifier which mixes with said paste to the plates to improve formation characteristics and reduce self-discharge tendencies, wherein the modifier is an oxidant.

12. A method for improving the formation and self-discharge characteristics of battery electrodes, the battery electrodes having thin, non-perforated battery plates coated with thin layers of damp, active material which are subsequently dried and rolled into a cylindrical form, the method including the steps of:
    a) forming an aqueous mixture of a modifier which mixes with the damp, active material to improve formation characteristics and reduce self-discharge tendencies; and
    b) applying the modifier to the electrode before drying thereof, whereby the modifier penetrates at least a surface of the layer of active material and mixes therewith.

13. The method of claim 12 wherein the modifier is applied to the active material after the active material has been applied to the plates.

14. The method of claim 12 wherein the aqueous mixture includes 10%–30% by weight of the modifier.

15. The method of claim 12 wherein the modifier is selected from the group of consisting of binders and oxidizers.

16. An electrode for an electrochemical cell made by the process of claim 12.

17. A method for improving the formation and self-discharge characteristics of battery electrodes, the battery electrodes having thin, non-perforated battery plates coated with thin layers of damp, active material which are subsequently dried and rolled into a cylindrical form, the method including the steps of:
    a) forming an aqueous mixture of a modifier which mixes with the damp, active material; and
    b) applying the modifier to the electrode before applying the active material to the plates and before the drying thereof, whereby the modifier penetrates at least a surface of the layer of active material.

18. A method for improving the formation and self-discharge characteristics of battery electrodes, the battery electrodes having thin, non-perforated battery plates coated with thin layers of damp, active material which are subsequently dried and rolled into a cylindrical form, the method including the steps of:
    a) forming an aqueous mixture of a modifier which mixes with the damp, active material; and
    b) applying the modifier to the electrode simultaneously with the active material and before drying thereof, whereby the modifier penetrates at least a surface of the layer of active material.

19. A method for improving the formation and self-discharge characteristics of battery electrodes, the battery electrodes having thin, non-perforated battery plates coated with thin layers of damp, active material which are subsequently dried and rolled into a cylindrical form, the method including the steps of:
    a) forming an aqueous mixture of a modifier which mixes with the damp, active material; and
    b) applying potassium persulfate to the electrode before the drying thereof, whereby potassium persulfate penetrates at least a surface of the layer of active material.

20. The method of claim 19 wherein the potassium persulfate aqueous mixture contains from 10%–30% by weight of potassium persulfate and the mixture is applied so that the amount of potassium persulfate is 2%–25% of the weight of the active material.

21. In a method for preparing electrodes for electrochemical cells in which electrode plates are coated with a damp, dryable active paste material and are subsequently dried and wound into a substantially cylindrical configuration, the improvement comprising mixing a modifier into said paste on said plates before drying of the paste takes place to improve formation characteristics and to reduce self-discharge tendencies.

22. A method for pasting electrochemical cell substrates comprising the steps of:
    forming a non-perforated positive battery plate;
    forming a non-perforated negative plate;
    applying said paste to said positive and negative battery plates;
    forming a modifier from an aqueous solution of an oxidizer; and
    applying said modifier to said positive and negative battery plates before said paste dries, the application of said paste and said modifier being carried out under high pressure.

* * * * *